(12) United States Patent
Coldwell et al.

(10) Patent No.: US 11,436,654 B2
(45) Date of Patent: Sep. 6, 2022

(54) DISPLAYING IN REAL-TIME PREBUILT DEVICES THAT MATCH A CUSTOM CONFIGURED DEVICE

(71) Applicant: Dell Products L. P., Round Rock, TX (US)

(72) Inventors: Andrea C. Coldwell, Austin, TX (US); Nora H. Farouk, Austin, TX (US); Jason B. Singh, Round Rock, TX (US); Anil Kumar Kotha, Austin, TX (US); Daniel Luna, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 740 days.

(21) Appl. No.: 15/884,701

(22) Filed: Jan. 31, 2018

(65) Prior Publication Data

US 2019/0236672 A1   Aug. 1, 2019

(51) Int. Cl.
*G06Q 30/00* (2012.01)
*G06Q 30/06* (2012.01)
(Continued)

(52) U.S. Cl.
CPC ....... *G06Q 30/0621* (2013.01); *G06Q 10/087* (2013.01); *G06F 3/04842* (2013.01)

(58) Field of Classification Search
CPC ............ G06Q 30/0621; G06Q 10/087; G06Q 30/0601–0643; G06Q 30/00; G06F 3/04842
See application file for complete search history.

(56) References Cited

U.S. PATENT DOCUMENTS 6,167,383 A * 12/2000 Henson .................. G06Q 30/06
                                                          705/26.5
6,954,734 B1 * 10/2005 Kuelbs ................. G06Q 10/025
                                                          705/14.1
(Continued)

OTHER PUBLICATIONS

Gordon, Whitson. Is Building a PC Really Cheaper than Buying One? Oct. 10, 2013.*

(Continued)

*Primary Examiner* — Mark A Fadok
(74) *Attorney, Agent, or Firm* — Krishnendu Guptsa; Nikhil Patel (57) ABSTRACT

In some examples, a computing device may display a build-to-order user interface to enable a default configuration of a configurable device to be modified. The computing device may receive modifications to the default configuration and modify the default configuration to create a modified configuration of the configurable device. The computing device may identify prebuilt devices with configurations matching at least a portion of the modified configuration. For example, the computing device may determine a score for individual prebuilt devices indicating how many options of the individual prebuilt device are similar or identical to corresponding options of the modified configuration of the configurable device. The computing device may display at least a portion of the matching prebuilt devices in a particular order that is based on the score associated with individual prebuilt devices. The computing device may receive a selection to acquire a particular one of the prebuilt devices.

20 Claims, 5 Drawing Sheets

(51) Int. Cl.
  *G06Q 10/08*  (2012.01)
  *G06F 3/04842*  (2022.01)

(56) References Cited

U.S. PATENT DOCUMENTS

| | | | | |
|---|---|---|---|---|
| 7,627,503 | B1* | 12/2009 | Champagne | G06Q 10/0833 |
| | | | | 705/26.5 |
| 8,364,559 | B1* | 1/2013 | Bhosle | G06Q 30/00 |
| | | | | 705/26.63 |
| 8,417,578 | B1* | 4/2013 | Evans | G06Q 30/0621 |
| | | | | 705/26.1 |
| 8,660,912 | B1* | 2/2014 | Dandekar | G06Q 30/02 |
| | | | | 705/27.1 |
| 10,061,692 | B1* | 8/2018 | Nicklin | G06F 3/0631 |
| 2010/0332350 | A1* | 12/2010 | Rinehart | G06Q 30/0643 |
| | | | | 705/27.2 |
| 2013/0211927 | A1* | 8/2013 | Kellogg | G06Q 30/0629 |
| | | | | 705/14.73 |
| 2016/0063595 | A1* | 3/2016 | Oral | G06Q 30/0631 |
| | | | | 705/26.7 |
| 2017/0206305 | A1* | 7/2017 | Hunsaker | G06F 30/15 |
| 2018/0174223 | A1* | 6/2018 | Cantrell | G06Q 30/0613 |

OTHER PUBLICATIONS (Dell User Guide, "Premier Dell.com Users' Guide—How to Configure and Price", http://www.dell.com > premier > tutorial > online_config dated Jan. 31, 2001. (Year: 2001).*

Randall Taylor, "Research Note—User design of customized products", Penn Libraries, Dated Mar. 2003. (Year: 2003).*

* cited by examiner

DISPLAYING IN REAL-TIME PREBUILT DEVICES THAT MATCH A CUSTOM CONFIGURED DEVICE

BACKGROUND OF THE INVENTION

Field of the Invention

This invention relates generally to computing devices and, more particularly to displaying prebuilt computing devices currently in inventory when a user is configuring a custom computing device to be built for the user.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When shopping for a device (e.g., a tablet, a laptop, a desktop, a wireless phone, or other computing device), a customer may discover that hundreds of such devices are available for purchase. If a customer is unable to find a device that exactly matches their particular requirements, the customer may customize a configurable device by selecting from available options. However, while customizing the configurable device, the customer may be unaware of other devices with similar (or identical) configurations that may be cheaper and that may be shipped to the customer faster than a custom configured product.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may display a build-to-order (BTO) user interface to enable a default configuration of a configurable device to be modified. The computing device may receive, via the user interface, modifications to the default configuration and modify the default configuration to create a modified configuration of the configurable device. The user interface may include software to identify prebuilt devices with configurations matching at least a portion of the modified configuration. For example, the software may determine a score for individual prebuilt devices indicating how many options of the individual prebuilt device are similar or identical to corresponding options of the modified configuration of the configurable device. The software may display, on the computing device, at least a portion of the matching prebuilt devices in a particular order that is based on the score associated with individual prebuilt devices. The software may receive a selection to acquire a particular one of the prebuilt devices.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

When a user opens a web browser and navigates to a manufacturer's site to custom configure a device (e.g., personal computer, server, tablet, phone, or the like), the systems and techniques described herein may monitor the user's choices, identify prebuilt devices (e.g., in inventory) that match at least a portion of the user's device configuration, and display the matching devices. The matching devices may or may not be exact matches to the user's device configuration, but may match at least one of the options that the user configured during the custom device configuration. The systems and techniques described herein may determine a priority for individual ones of the user's selections during the configuration process and identify matching prebuilt devices based on the top S (where S>1) option selections. The matching prebuilt devices may have at least some (e.g., S) options that are the same or better than the options that the user selected. For example, for those options that are determined to be important to the user, the matching prebuilt devices may have the same or better options. For those options that are determined to be less important (or unimportant) to the user, the matching prebuilt devices may have the same, similar, better, or different options. For example, if the type of video processor (e.g., graphics processing unit (GPU)) is determined to be unimportant to the user, whether the device uses an Intel® GPU, an AMD® GPU, or an NVIDIA® GPU may not be taken into account when identifying matching devices. As another example, the performance difference (e.g., time to boot the operating system) between 16 gigabytes (GB) of random access memory (RAM) compared to 8 GB RAM may be relatively small when using a device with a solid-state drive (SSD). In contrast, the performance difference between 16 GB RAM compared to 8 GB RAM may be noticeable when using a device with a mechanical disk drive. If the systems and techniques determine that a device with an SSD, rather than a mechanical disk drive (e.g., spinning at 7200 or 5400 revolutions per minute (RPM)), is important to the user, then devices with an SSD but with less than 16 GB RAM may be displayed as matching the user's configuration.

The manufacturer's site may provide a user interface (UI) that enables the user to select various options, such as, for example, the CPU manufacturer (e.g., Intel®, AMD®, ARM®, or the like), the type of processor (e.g., i3, i5, or i7) or a characteristic (number of cores) of the processor, a clock speed (e.g., between 1.0 GHz and 4.2 GHz) of the processor, a type of disk drive (e.g., SSD or mechanical), a drive capacity (e.g., 512 GB, 1 TB, or the like), an amount of main memory (e.g., RAM, such as 4 GB, 8 GB, 16 GB, or the like), GPU manufacturer (e.g., Intel®, AMD®, Nvidia®, or the like), and GPU memory (e.g., video RAM). If the computer is a laptop, the UI may display laptop-related options, such as, for example, screen size (e.g., 12", 13", 14", 15", 17" or the like), optical drive options (e.g., DVD-R, DVD-RW, Blu-ray-R, Blu-ray-RW, additional battery pack instead of optical drive, or the like), battery capacity (e.g., regular or extended capacity), and the like. If the computer is a desktop, the UI may display desktop-related options, such as, for example, adding one or more monitors (e.g., 24", 27", 32" or the like), optical drive options (e.g., DVD-R, DVD-RW, Blu-ray-R, or Blu-ray-RW, one drive or two drives), and the like.

The UI may provide selections tools, such as, for example, sliders, check boxes, or another type of selection tool to enable the user to configure individual options of the device. The systems and techniques may determine the priority of the options to the user based on an order in which the user selects the options. For example, the UI may pre-fill the options with default options (e.g., the most popular options selected by users) and allow the user to modify the default options. If the user first modifies the default type of processor, modifies the default drive type, and modifies the default drive capacity, leaving the other options at their default values, then the systems and techniques may determine that the priority of the options (in descending order) for the user is (1) processor type, (2) drive type, and (3) drive capacity. In this example, the systems and techniques may identify prebuilt devices that match the user's device configuration based on identifying prebuilt devices that have the same, similar or better processor type, drive type, and drive capacity.

Thus, a user may open a web browser, navigate to a manufacturer's site, and begin selecting options for a device using a device customization UI. When the UI is initially displayed, the options may be prefilled with default values. As part of the customization process, the user may modify one or more of the options from the default values. The systems and techniques may determine which options the user modifies and determine the order in which the options are modified. The systems and techniques may determine the priority of the options based on the order in which the options are modified. The customized device configuration, the modified options, and the priority of the options may be used to display, substantially in real-time (e.g., substantially at the same time that the user is configuring the configurable device), one or more products with matching (e.g., the same, similar, or better) options. For example, the systems and techniques may use the default options, the modified options, and the priority of the options to create a score (e.g., a weight) associated with individual matching prebuilt devices and display the matching prebuilt devices in descending order of the score (or weight).

When displaying the matching prebuilt devices in real-time, the systems and techniques may indicate that the prebuilt devices have faster delivery times and lower prices. Typically, the warehouses for prebuilt devices may be much closer to the user than the factories where custom devices are built, resulting in 3-5 day delivery for prebuilt devices and 7-10 day delivery for custom configured devices. Because manufacturing multiple devices on the same assembly line and shipping the multiple devices to a warehouse is typically cheaper than custom configuring a device and shipping the single custom device, in most cases, for the same or similar (e.g., matching) configuration, the prebuilt devices may be cheaper than the custom configured device. The systems and techniques may determine the matching products to display to the user by determining the options that the user is modifying from the default in real-time. After each modification, the modified option may be compared to the options of prebuilt devices. Thus, the systems and techniques may display to the user a set of one or more matching prebuilt devices substantially in real-time.

As a first example, a user may open a browser and navigate to a site (e.g., hosted by a device manufacturer) that displays a build-to-order user (BTO) interface (UI) including a default configuration of a computing device. The UI may enable the user to custom configure the computing device by modifying the default configuration. The user may enter one or more modifications modifying the default configuration to create a modified configuration of the computing device. For example, the modified configuration may include at least one of a modified processor manufacturer, a modified processor type, a modified processor clock speed, a modified drive type, a modified drive capacity, a modified amount of random access memory (RAM), a modified graphics processing unit (GPU) manufacturer, a modified amount of video RAM, a modified display device size, another modification, or any combination thereof. The site may keep track of an order in which the user modifies the default configuration and determine a priority associated with each modification based at least in part on the order.

The site may determine a score for individual prebuilt computing devices that are currently in inventory at warehouses that are geographically closer to the user than a build-to-order (BTO) factory that can build the modified configuration. The site may display, substantially in real-time (e.g., while the user is modifying the default configuration or less than a second after the user has completed modifying the default configuration) one or more prebuilt computing devices (e.g., in descending order of the associated score) devices that match the modified configuration. For example, the prebuilt computing devices that are displayed in real-time may have one or more prebuilt options that match (e.g., are similar or identical to) one or more modified options of the modified configuration. At least some of the prebuilt computing devices may have a lower price compared to the modified configuration, an earlier delivery date compared to the modified configuration, or both. After viewing the matching prebuilt computing devices, the user may enter a selection to acquire (e.g., lease or purchase) a particular prebuilt computing device of the prebuilt computing devices. In response, the site may send an order indicating an acquisition of the particular prebuilt computing device. The particular prebuilt computing device may be a laptop computing device, a desktop computing device, a server computing device, a tablet computing device, or a wireless phone.

As a second example, a computing device may include one or more processors and one or more non-transitory computer readable media storing instructions executable by the one or more processors to perform various operations. The operations may include displaying a default configuration of a configurable device, displaying a build-to-order (BTO) user interface to modify the default configuration, receiving a plurality of modifications to the default configuration, and modifying the default configuration based on the plurality of modifications to create a modified configuration of the configurable device. The modified configuration may include at least one of a modified processor manufacturer, a modified processor type, a modified processor clock speed, a modified drive type, a modified drive capacity, a modified amount of random access memory (RAM), a modified graphics processing unit (GPU) manufacturer, a modified amount of video RAM, a modified display device size, another modified option, or any combination thereof. The operations may include determining an order in which the plurality of modifications to the default configuration are performed, determining a priority associated with each modification of the plurality of modifications based at least in part on the order, determining (e.g., based at least in part on the priority) an associated score for individual prebuilt device of one or more prebuilt devices that match the modified configuration, and displaying (e.g., in descending order of the associated score) the one or more prebuilt devices that match the modified configuration. The prebuilt devices may be displayed in real-time, e.g., while the user I making modifications or less than a second after the user completes making the modifications). The operations may include receiving a selection to acquire a particular prebuilt device of the one or more prebuilt devices and, in response, sending an order indicating acquisition of the particular prebuilt device. The particular prebuilt device may have a lower price compared to ordering the modified configuration of the configurable device. The particular prebuilt device may have an earlier delivery date as compared to the modified configuration of the configurable device. The particular prebuilt device may include at least one prebuilt option that is identical or similar to an option of the modified configuration of the configurable device. In some cases, the particular prebuilt device may include at least one prebuilt option that exceeds an option of the modified configuration of the configurable device.

As a third example, instructions stored in a memory of a device may be executed by one or more processors to perform various operations. The operations may include displaying a default configuration of a configurable device, displaying a build-to-order (BTO) user interface to modify the default configuration, receiving a plurality of modifications to the default configuration, and modifying the default configuration based on the plurality of modifications to create a modified configuration of the configurable device. The modified configuration may include at least one of a modified processor manufacturer, a modified processor type, a modified processor clock speed, a modified drive type, a modified drive capacity, a modified amount of random access memory (RAM), a modified graphics processing unit (GPU) manufacturer, a modified amount of video RAM, a modified display device size, another modification to the configurable device, or any combination thereof. The operations may include displaying one or more prebuilt devices that match the modified configuration. For example, the operations may include determining an order in which the modifications to the default configuration are performed, determining a priority associated with each modification based on the order, determining, based on the priority, an associated score for individual prebuilt device of the one or more prebuilt devices, and displaying in real-time, in descending order of the associated score, the prebuilt devices that match the modified configuration. Determining the score associated with the particular prebuilt device may include determining a weight of individual options of individual prebuilt devices based on the priority, assigning 1 to a multiplier when an option of the particular prebuilt device is similar or identical to a corresponding option of the modified configuration, assigning 0 to the multiplier when the option of the particular prebuilt device is lesser than the corresponding option of the modified configuration, and determining the score by determining a sum of multiplying the weight of individual options with the multiplier. In some cases, assigning a value greater than 1 may be assigned to the multiplier when the option of the particular prebuilt device is better than the corresponding option of the modified configuration. The operations may include receiving a selection to acquire (e.g. lease or purchase) a particular prebuilt device of the one or more prebuilt devices and sending an order indicating acquisition of the particular prebuilt device. The particular prebuilt device may include a first prebuilt option that is identical or similar to an option of the modified configuration of the configurable device. For example, the particular prebuilt device may include an i5 processor running at 3.0 GHz that is identical to the 3.0 GHz i5 processor in the modified configuration of the configurable device. In some cases, the particular prebuilt device may include a second prebuilt option that exceeds an option of the modified configuration of the configurable device. For example, the particular prebuilt device may include an i5 processor running at 3.2 GHz that exceeds the i5 processor running at 3.0 GHz (or less) of the modified configuration of the configurable device. As another example, the particular prebuilt device may include 512 GB SSD that exceeds 256 GB SSD in the modified configuration of the configurable device. The particular prebuilt device may be located at a warehouse that is closer to a delivery address specified in the order than a factory that builds the configurable device with the modified configuration.

Figure 1:
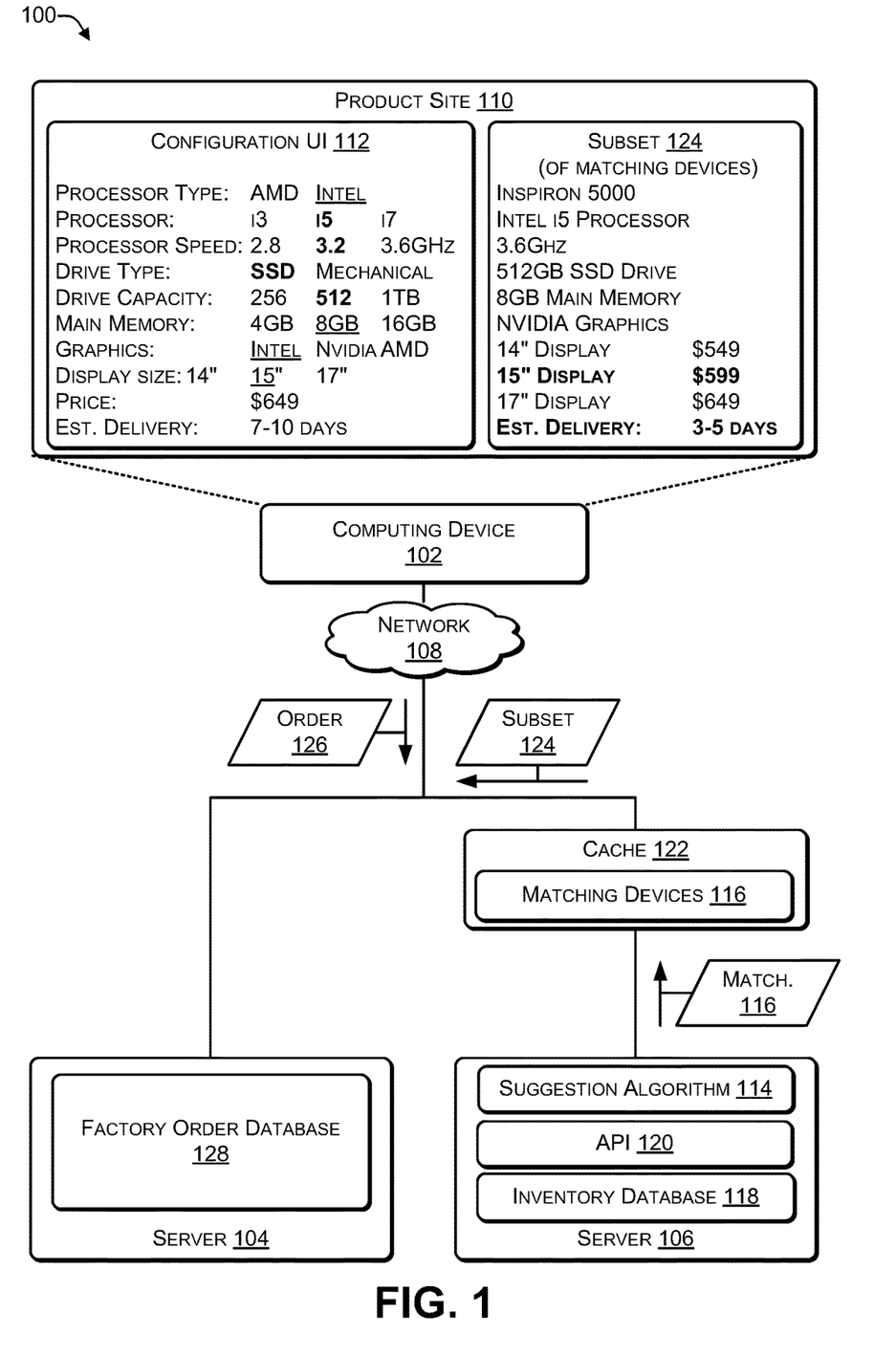
FIG. 1 is a block diagram of an architecture of a computing device connected to one or more servers by a network according to some embodiments.

FIG. 1 is a block diagram of an architecture 100 that includes a computing device connected to one or more servers by a network according to some embodiments. A computing device 102 may be connected to a server 104 and a server 106 via a network 108.

A user may open a web browser on the computing device 102 and navigate to a product site 110. The product site 110 may provide a configuration UI 112 to enable the user to configure a device (e.g., laptop, desktop, server, tablet, phone, or the like). In FIG. 1, the underlined options indicate the prefilled default options and the bolded options indicate user selections. In FIG. 1, the user has selected an i5 processor instead of the default i3 processor and selected a 512 GB SDD instead of the default 1 TB mechanical disk drive.

As the user modifies one or more of the options of the default configuration in the configuration UI 112, a suggestion algorithm 114 on the server 106 may determine the modifications being made and the order in which the modifications are being made. The suggestion algorithm 114 may identify one or more matching devices 116 from an inventory of devices stored in an inventory database 118. In some cases, the suggestion algorithm 114 may use an applications programming interface (API) 120 (or similar interface) to extract the matching devices 116 from the inventory database 118.

In some cases, the matching devices 116 may be stored in a cache 122. The cache 122 may be a temporary memory location on the server 106, on the computing device 102, or both. For example, after the user's initial selection of an i5 processor, the suggestion algorithm 114 may extract (e.g., using the API 120) devices from the inventory database 118 that include an i5 processor. Thus, the matching devices 116 may include a set of devices that match at least one modification (but possibly not all modifications) made by the user. As the user continues to make additional modifications, such as the processor speed, an SSD, and the capacity of the SSD, the suggestion algorithm 114 may continue filtering (e.g., substantially in real-time) the matching devices 116 based on the additional modifications. The suggestion algorithm 114 may determine when the user pauses or has completed making modifications to the default configuration. For example, if the suggestion algorithm 114 determines that the user has not provided input using the configuration UI 112 for more than a threshold amount of time (e.g., Y seconds, where Y>0), then the suggestion algorithm 114 may assume that the user has paused or has completed making modifications to the default configuration. In response, the suggestion algorithm 114 may identify, substantially in real-time (e.g., within N milliseconds, where N>0), a subset 124 of the matching devices 116, where the subset 124 includes devices matching at least one of the additional modifications made by the user. For example, the matching devices 116 may include devices with an i5 processor while the subset 124 may include (1) devices with an i5 running at 3.2 GHz or (2) devices with an i5 processor and an SSD. By storing the matching devices 116 in the cache 122, the subset 124 may be displayed substantially in real-time and within a short time (e.g., Z milliseconds, where Z>0) after the user makes a modification to the default configuration using the configuration UI 112.

The subset 124 may be displayed in a window that is near (e.g., adjacent to) where the configuration UI 112 is displayed. The subset 124 may emphasize the lower price and faster delivery time of the prebuilt devices. In some cases, e.g., if inventory levels of prebuilt devices exceeds a threshold, the user may be provided with additional incentives to acquire a prebuilt device rather than a custom configured device. For example, the additional incentives may include additional (e.g., double or triple) rewards points, free upgrade to faster (e.g., two day) delivery, another incentive, or any combination thereof.

In FIG. 1, the subset 124 includes a device with an i5 processor with a faster processor speed (e.g., 3.6 GHz instead of 3.2 GHz), and Nvidia graphics instead of Intel graphics (e.g., Nvidia graphics may be considered comparable or slightly better than Intel graphics). Based on the example illustrated in FIG. 1, compared to purchasing a custom configured device, the user can (1) save $50 (e.g., $599 instead of $649) and receive the device several days sooner or (2) acquire a device with a bigger display (e.g., 17") for the same price (e.g., $649) and receive the device several days sooner.

The user may place an order 126 selecting either the custom configured device in the configuration UI 112 or one of the devices in the subset 124 (of the matching devices 116). If the order 126 selects the custom configured device, then the order 126 may be received by the server 104 and placed in a factory order database 128 for fulfillment by a factory that creates build-to-order (BTO) devices. If the order 126 selects one of the devices in the subset 124, then the order 126 may be received by the server 106 and sent for fulfillment to the appropriate warehouse whose inventory includes the selected device.

Thus, a user may open a web browser, navigate to a manufacturer's site, and begin selecting options for a device using a device customization UI. When the UI is displayed, the options may be prefilled with default values that the user may modify. A suggestion algorithm may determine which options the user modifies, determine the order in which the options are modified, and display, substantially in real-time, one or more products with matching (e.g., the same, similar, or better) options from an inventory database of prebuilt devices. The suggestion algorithm may use the default options, the modified options, and the priority of the options to create a weight or a score for individual matching prebuilt devices and display the matching prebuilt devices in descending order of the weight or score. The suggestion algorithm may indicate that the prebuilt devices have faster delivery times and lower prices. The suggestion algorithm may determine the matching products to display by determining the options that the user is modifying substantially in real-time. After each modification, the modified option may be compared to the specification of the prebuilt devices. As the user modifies the custom configured device, the suggestion algorithm may display a subset of one or more matching prebuilt devices substantially in real-time.

Figure 2:
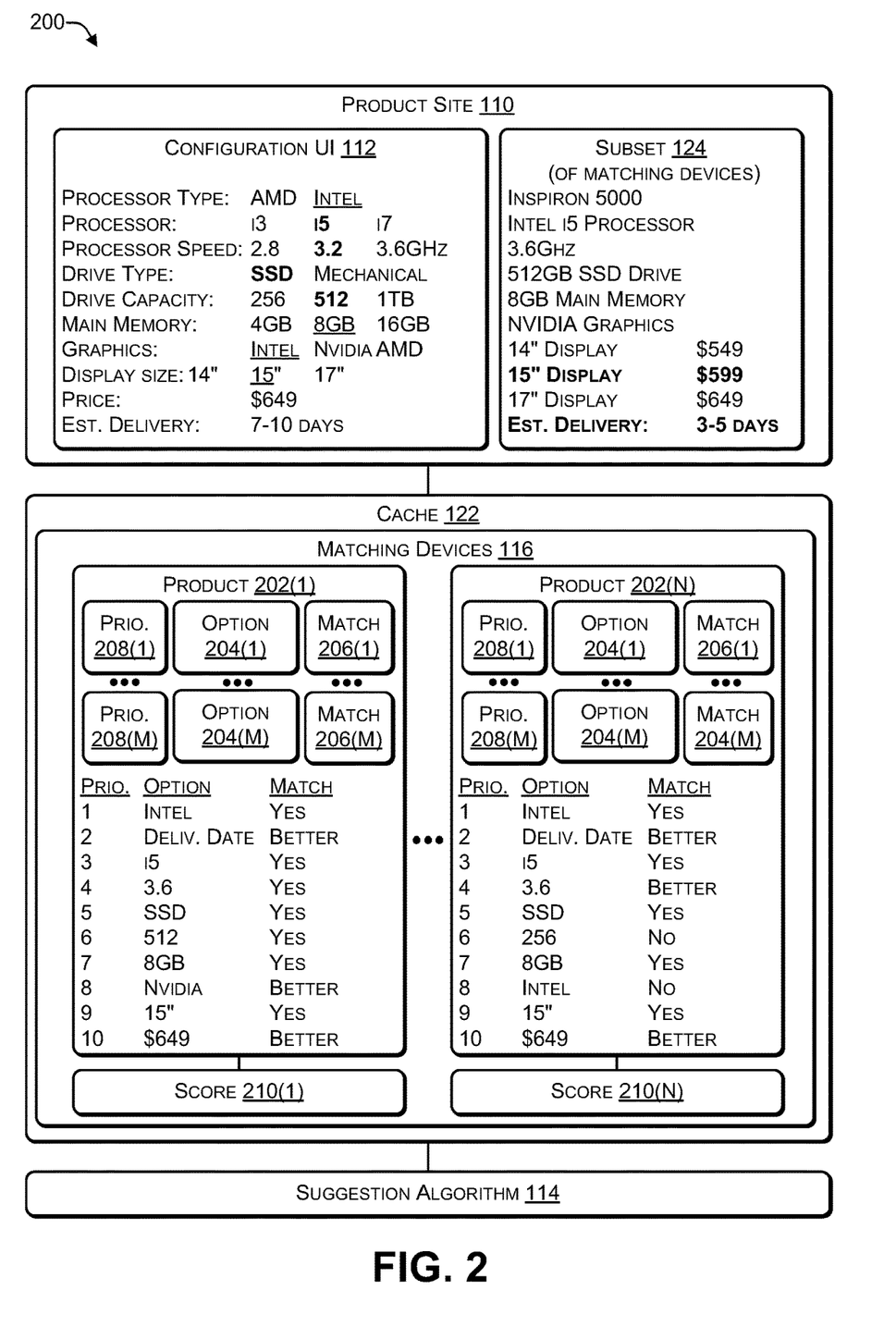
FIG. 2 is a block diagram illustrating determining matching prebuilt devices according to some embodiments.

FIG. 2 is a block diagram 200 illustrating determining matching prebuilt devices according to some embodiments. The matching devices 116 may include a product 202(1) to a product 202(N) (N>0). Each of the products 202 may have multiple options 204(1) to 204(M) (M>0, M not necessarily equal to N), such as for example, the manufacturer of the CPU, the CPU model, the CPU clock speed, the type of storage device, the capacity of the storage device, the amount of memory (e.g., RAM), the GPU manufacturer, an amount of dedicated video memory for the GPU, a display device size, a price, a delivery date by which the device can be delivered, another device option, or any combination thereof.

Individual ones of the products 202 may have a match field 206 that indicates whether the option 204 for the particular product 202 is a match for the custom configured device in the configuration UI 112. In some cases, the match 206 field may be binary, e.g., taking on a value of either Yes (e.g., True) or No (e.g., False). In such cases, if the option 204 is the same, similar, or better, then the value of match 206 may be set to Yes and if the option 204 is different, dissimilar, or lesser, then the value of match 206 may be set to No. In some cases, the match 206 field may be ternary and take on one of three values, either Yes (e.g., =), Better (e.g., >), or No (e.g., <), as illustrated in FIG. 2. In such cases, if the option 204 is the same or similar then the value of match 206 may be set to Yes, if the option 204 is dissimilar or lesser then the value of match 206 may be set to No, and if the option 204 is better, then the value of match 206 may be set to Better.

In some cases, a priority 208 may be associated with individual ones of the options 204. The priorities 208 for the options 204 may be determined using various different techniques. For example, the priorities 208 may be determined based on observing an order in which the user modifies the default options when configuring a custom device using the configuration UI 112. To illustrate, if the user first modifies the type of processor (e.g., selecting i5 instead of i3), modifies the delivery options to provide faster delivery, modifies the drive type (e.g., from mechanical to SSD), and modifies the drive capacity (e.g., from 256 GB to 512 GB), then the suggestion algorithm 114 may determine the priority order to be (1) processor type, (2) faster delivery, (3) SSD, and (4) at least 512 GB capacity. As another example, the priorities 208 may be determined based on displaying a priority field for individual options in the configuration UI 112 and receiving a user selection regarding the priority to be associated with one or more of the options. As yet another example, the priority 208 may be determined based on analyzing, using machine learning, the order in which users select the options in the configuration UI 112 to determine a default set of priorities.

The priorities 208 and the matches 206 may be used to determine a score 210 for individual ones of the products 202. For example, if there are no more than 10 option priorities, then the highest priority may be assigned 100, the next highest 90, and so on. In a binary match system, Yes=1 and No=0. The score 210(N) for the product 202(N) may be determined by summing across a particular number of options, e.g., (208(1)×206(1)=210(1))+(208(2)×206(2)=210(2)) . . . +(208(P)×206(P)=210(P)), where P=the number of options being considered. To enable the subset 124 of matching prebuilt devices 116 to be displayed substantially in real-time, P may be kept to 10 or less. For example, the manufacturer may determine, that for most (e.g., 80%) of users, P number of options (e.g., P=3, 4, 5, or 6) yields satisfactory results. For example, for P=4:

TABLE 1A

Product 202(1)

| Priority 208 | Option 204 | Match 206 | Priority × Match |
|---|---|---|---|
| 1 | Processor Type | Yes | 100 × 1 = 100 |
| 2 | Type of drive | Yes | 90 × 1 = 90 |
| 3 | Drive Capacity | Yes | 80 × 1 = 80 |
| 4 | GPU Manufacturer | No | 70 × 0 = 0 |
| Score 210(1) | | | 270 |

TABLE 1B

Product 202(2)

| Priority 208 | Option 204 | Match 206 | Priority × Match |
|---|---|---|---|
| 1 | Processor Type | Yes | 100 × 1 = 100 |
| 2 | Type of drive | Yes | 90 × 1 = 90 |
| 3 | Drive Capacity | No | 80 × 0 = 0 |
| 4 | GPU Manufacturer | No | 70 × 0 = 0 |
| Score 210(2) | | | 190 |

Table 1A illustrates determining the score 210(1) for the product 202(1) and Table 1B illustrates determining a score 210(2) for a product 202(2), when P=4. In this example, product 202(1) matches 3 of the 4 options that are determined to be important to the user, resulting in a score of 270, while product 202(1) matches 2 of the 4 options, resulting in a score of 190. When displaying the subset 124, the devices may be displayed in descending order of the associated score 210. In this example, product 202(1) may be displayed first, followed by product 202(2) because the score 210(1) is higher than the score 210(2).

In a ternary match system, Yes=1, No=0, and Better is greater than 1, e.g., 1.10, 1.25, 1.5, 1.75 or the like. In such a system, a high priority option that is better on a prebuilt product than on the custom configured product may be given additional weight. The device manufacturer may select and, in some cases, change the specific multiplier (e.g., 1.10, 1.25, 1.5, 1.75 or the like) that is used. For example, if a particular option is popular or has a high priority, the particular option may be given a higher multiplier than less popular or lower priority options. For example, if the manufacturer determines that devices with an SSD are more popular than devices without an SSD (e.g., due to significantly faster boot times for SSD equipped devices), then devices with an SSD may be assigned a multiplier of 1.5, thereby increasing the score of SSD equipped devices. Other options may be determined to be less important to customers and be assigned a smaller multiplier. For example, processor clock speed may be less important and may be assigned a multiplier of 1.10 or 1.25. In the following example, Better uses a multiplier of 1.25:

TABLE 2A

Product 202(3)

| Priority 208 | Option 204 | Match 206 | Priority × Match |
|---|---|---|---|
| 1 | Processor Type | Yes | 100 × 1 = 100 |
| 2 | CPU Clock Speed | Yes | 90 × 1 = 90 |
| 3 | Drive Capacity | Yes | 80 × 1 = 80 |
| 4 | GPU Manufacturer | No | 70 × 1 = 70 |
| Score 210(3) | | | 270 |

TABLE 1B

Product 202(4)

| Priority 208 | Option 204 | Match 206 | Priority × Match |
|---|---|---|---|
| 1 | Processor Type | Yes | 100 × 1 = 100 |
| 2 | CPU Clock Speed | Yes | 90 × 1 = 90 |
| 3 | Drive Capacity | Better | 80 × 1.25 = 100 |
| 4 | GPU Manufacturer | No | 70 × 0 = 0 |
| Score 210(4) | | | 290 |

Table 2A illustrates determining a score 210(3) for a product 202(3) and Table 1B illustrates determining a score

210(4) for a product 202(4), when P=4. In this second example, product 202(3) matches 3 of the 4 options that are determined to be important to the user, resulting in a score of 270, while product 202(1) matches 2 of the 4 options and has one option that is better than what the user selected, resulting in a score of 290. When displaying the subset 124, the devices may be displayed in descending order of the associated score 210. In this second example, product 202(4) may be displayed first, followed by product 202(3) because the score 210(4) is higher than the score 210(3).

Thus, based on the options that the user modifies and the order in which the user modifies the options, the suggestion algorithm may identify the matching devices 116 and display the subset 124 of available prebuilt devices that match the user's custom configuration. The matching devices 116 may be determined by identifying which of the options individual prebuilt devices in a prebuilt device inventory database match the selected options. Each device may be assigned a score based on the number of matching options. In some cases, the score may take into account a priority of the options. The resulting matching devices may be displayed in descending order of score, with the highest scoring devices (e.g., having the highest number of matches) displayed before lower scoring devices (e.g., having a lower number of matches).

Figure 3:
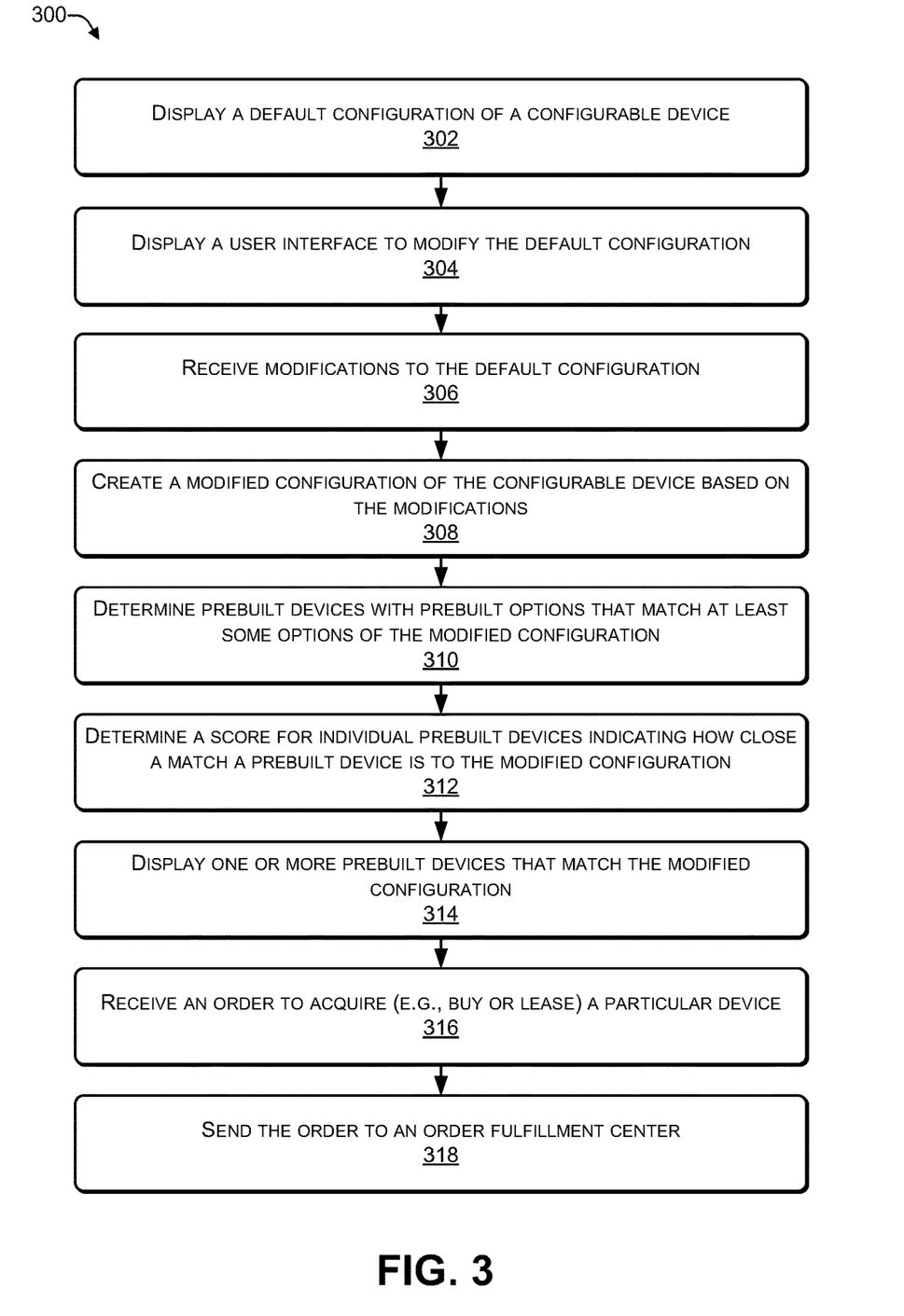
FIG. 3 is a flowchart of a process that includes determining a score individual prebuilt devices according to some embodiments.
Figure 4:
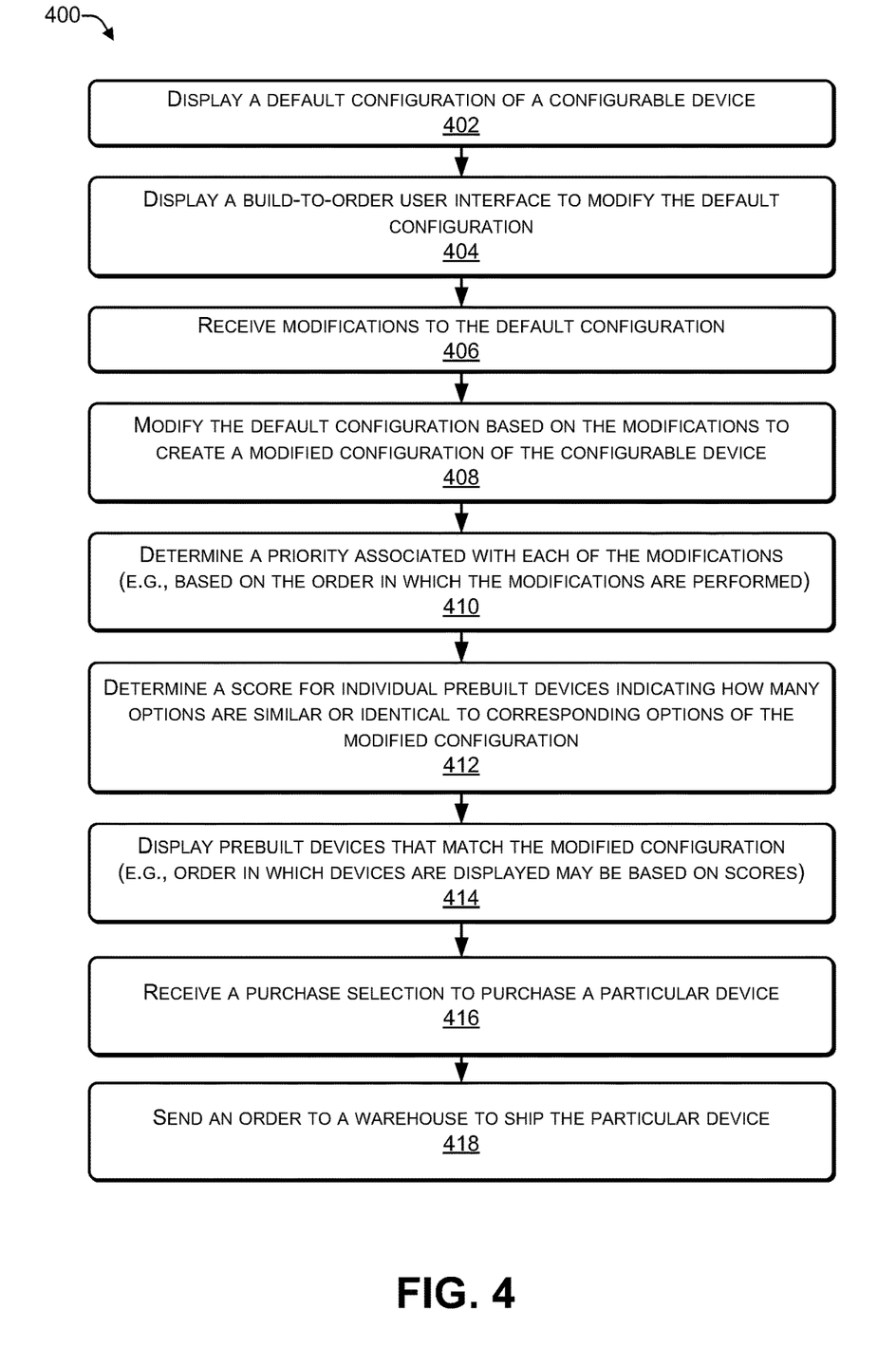
FIG. 4 is a flowchart of a process that includes displaying prebuilt devices that match a modified configuration (e.g., of a built-to-order device) according to some embodiments.

In the flow diagrams of FIG. 3 and FIG. 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300 and 400 are described with reference to FIGS. 1, 2, and 3, as described above, although other models, frameworks, systems and environments may be used to implement this process.

FIG. 3 is a flowchart of a process 300 that includes determining a score individual prebuilt devices according to some embodiments. The process 300 may be performed by one or more components of the server 106, such as, for example, the suggestion algorithm 114 of FIGS. 1 and 2.

At 302, a default configuration of a configurable device may be displayed. At 304, a UI to modify the default configuration may be displayed. For example, in FIG. 1, the configuration UI 112 may display a configurable device with default options. The configuration UI 112 may enable the user to modify one or more of the default options.

At 306, one or more modifications to the default configuration may be received. At 308, the default configuration may be modified, based on the one or more modifications, to create a modified configuration of the configurable device. For example, in FIG. 1, the user may modify the processor from an i3 (default) to an i5, modify the processor speed from 2.8 GHz (default) to 3.2 GHz, modify the drive type from mechanical (default) to SSD, and modify the drive capacity from 256 GB (default) to 512 GB. In FIG. 1, an underlined option indicates a default while a bold option indicates a modification. The configuration UI 112 may display the modified configuration as the user is performing the modifications.

At 310, prebuilt devices match one or more options of the modified configuration may be determined. At 312, a score may be determined for and associated with individual ones of the prebuilt devices. Each associated score may indicate how many options of a particular prebuilt device are similar or identical to corresponding options of the modified configuration. For example, in FIG. 2, the score 210(1) may be determined for the product 202(1) and the score 210(N) may be determined for the product 202(N). The scores 210(N) may be determined based on how many of the options 204 are a match 206 to the modified configuration displayed in the configuration UI 112. For example, in a system where a higher score indicates more matches, if the product 202(N) has more options 204 that match 206 the modified configuration of the configurable device than the product 202(1), then the score 210(N) may be higher than the score 210(1). In a system where a lower score indicates more matches, if the product 202(N) has more options 204 that match 206 the modified configuration of the configurable device than the product 202(1), then the score 210(N) may be lower than the score 210(1).

At 314, one or more prebuilt devices that match the modified configuration may be displayed, substantially in real-time (e.g., within N milliseconds after the user creates the modified configuration, where N>0). The order in which the prebuilt devices are displayed may be determined, at least in part, on how many matches there are between (i) the prebuilt device configuration and (ii) the modified configuration of the configurable device. For example, the matching prebuilt devices may be displayed in descending order of score because the score indicates how close a match the configuration of the prebuilt device is to the modified configuration. In this way, a prebuilt device having the highest score (e.g., indicating a relatively close match to the modified configuration) may be displayed before a prebuilt device having a lower score. For example, in FIG. 2, the subset 124 may include P prebuilt devices 116 (where P>0) that have the most matches (e.g., highest score). The prebuilt devices in the subset 124 may be displayed with the prebuilt device having the highest number of matches displayed first, followed by the prebuilt device having the second highest number of matches, and so on (e.g., in descending order of score when a high score indicates a large number of matches).

At 316, an order may be received to acquire (e.g., buy or lease) a particular device (e.g., either a matching prebuilt device or a custom-built device with the modified configuration). At 318, an order may be sent to an order fulfillment center. For example, the user may place an order for either (1) one of the prebuilt devices being displayed in the subset 124 or (2) the modified configuration of the configurable device displayed by the configuration UI 112. If the user places an order for one of the prebuilt devices being displayed in the subset 124, then the order may be sent for fulfillment to a nearest warehouse with an inventory of the selected prebuilt device. If the user places an order for the modified configuration of the configurable device displayed by the configuration UI 112, then the order may be sent for fulfillment to an order entry database of a build-to-order (BTO) factory that will build a custom device with the modified configuration and ship the custom device to the user.

Thus, a user may navigate to a manufacturer's site to display a UI for a configurable (e.g., build-to-order) device. The UI may display the configurable device with default options and enable the user to modify the default options. A suggestion algorithm may determine which options the user modifies, and display, substantially in real-time, one or more products with matching (e.g., having the same, similar, or better) options from a database associated with an inventory of prebuilt devices. In some cases, the suggestion algorithm may determine the order in which the user modifies the default options and determine a priority of the options (e.g., to the user) based on the order. The suggestion algorithm may use the default (e.g., unmodified) options, the modified options, and, in some cases, the priority of the options to create a score for matching prebuilt devices and display the matching prebuilt devices in descending order of the score. Thus, a prebuilt device that has a large number of matches may be displayed before a prebuilt device that has a fewer number of matches. The suggestion algorithm may indicate that the prebuilt devices have faster delivery times, lower prices, or both. For example, the prebuilt devices may be cheaper to build because they can be built on an assembly line and achieve economies of scale in terms of the components that are used to make each device. The warehouses that are used to store the prebuilt devices may be closer to (e.g., in the same country as) the user than the build-to-order factory (which may be in a different country than where the user is located). In some cases, after the user makes a modification to an option of the configurable device using the configuration UI, the modified option may be compared to the specification of the prebuilt devices. Thus, as the user modifies the configuration of the configurable device, the suggestion algorithm may display, substantially in real-time, a subset of one or more matching prebuilt devices.

FIG. 4 is a flowchart of a process 400 that includes displaying prebuilt devices that match a modified configuration (e.g., of a built-to-order device) according to some embodiments. The process 400 may be performed by one or more components of the server 106, such as, for example, the suggestion algorithm 114 of FIGS. 1 and 2.

At 402, a default configuration of a configurable device may be displayed. At 404, a build-to-order (BTO) UI to modify the default configuration may be displayed. For example, in FIG. 1, the configuration UI 112 may display a configurable device with default options. The configuration UI 112 may enable the user to modify one or more of the default options.

At 406, one or more modifications to the default configuration may be received. At 408, the default configuration may be modified, based on the one or more modifications, to create a modified configuration of the configurable device. For example, in FIG. 1, the user may modify the processor from an i3 (default) to an i5, modify the processor speed from 2.8 GHz (default) to 3.2 GHz, modify the drive type from mechanical (default) to SSD, and modify the drive capacity from 256 GB (default) to 512 GB. In FIG. 1, an underlined option indicates a default while a bold option indicates a modification. The configuration UI 112 may display the modified configuration as the user is performing the modifications.

At 410, a priority of individual modifications of the one or more modifications may be determined (e.g., based on the order in which the modifications are performed). For example, in FIG. 1, the order in which the user performs the modifications to the default configuration may be determined.

At 412, a score for individual prebuilt devices may be determined. An individual score may indicate how many options of a particular prebuilt device are similar or identical to corresponding options of the modified configuration. For example, in FIG. 2, the score 210(1) may be determined for the product 202(1) and the score 210(N) may be determined for the product 202(N). The scores 210(N) may be determined based on how many of the options 204 are a match 206 to the modified configuration displayed in the configuration UI 112. For example, in a system where a higher score indicates more matches, if the product 202(N) has more options 204 that match 206 the modified configuration of the configurable device than the product 202(1), then the score 210(N) may be higher than the score 210(1). In a system where a lower score indicates more matches, if the product 202(N) has more options 204 that match 206 the modified configuration of the configurable device than the product 202(1), then the score 210(N) may be lower than the score 210(1).

At 414, one or more prebuilt devices that match the modified configuration may be displayed, substantially in real-time (e.g., within N milliseconds after the user creates the modified configuration, where N>0). The order in which the prebuilt devices are displayed may be determined, at least in part, on the scores. For example, the matching prebuilt devices may be displayed in descending order of score. In this way, a prebuilt device having the highest score, indicating a relatively close match to the modified configuration, may be displayed before a prebuilt device having a lower score. For example, in FIG. 2, the subset 124 may include P prebuilt devices 116 (where P>0) that have the most matches (e.g., highest score). The prebuilt devices in the subset 124 may be displayed with the prebuilt device having the highest number of matches displayed first, followed by the prebuilt device having the second highest number of matches, and so on (e.g., in descending order of score when a high score indicates a large number of matches).

At 416, a selection may be received to acquire a particular device (e.g., either a matching prebuilt device or the modified configuration of the configurable device). At 418, an order may be sent to a warehouse to ship the particular device. For example, the user may place an order for either (1) one of the prebuilt devices being displayed in the subset 124 or (2) the modified configuration of the configurable device displayed by the configuration UI 112. If the user places an order for one of the prebuilt devices being displayed in the subset 124, then the order may be sent to a nearest warehouse with an inventory of the selected prebuilt device. If the user places an order for the modified configuration of the configurable device displayed by the configuration UI 112, then the order may be sent to an order entry database for a build-to-order factory.

Thus, a user may navigate a browser to a manufacturer's site and display a build-to-order UI for a configurable device. When the configurable device is initially displayed, the options may be prefilled with default values. The build-to-order UI may enable the user to modify one or more of the default values. A suggestion algorithm may determine which options the user modifies, and display, substantially in real-time, one or more products with matching (e.g., having the same, similar, or better) options from a database associated with an inventory of prebuilt devices. In some cases, the suggestion algorithm may determine the order in which the user modifies the default options and determine a priority of the options (e.g., to the user) based on the order. The suggestion algorithm may use the default (e.g., unmodified) options, the modified options, and, in some cases, the priority of the options to create a weight or a score for individual matching prebuilt devices and display the matching prebuilt devices in descending order of the weight or score. Thus, a first prebuilt device that has a large number of matches to the user configuration may be displayed before a second prebuilt device that has a fewer number of matches to the user configuration. The suggestion algorithm may indicate that the prebuilt devices have faster delivery times, lower prices, or both. In some cases, after the user makes a modification to an option of the configurable device using the configuration UI, the modified option may be compared to the specification of the prebuilt devices. Thus, as the user modifies the configuration of the configurable device, the suggestion algorithm may display, substantially in real-time, a subset of one or more matching prebuilt devices.

Figure 5:
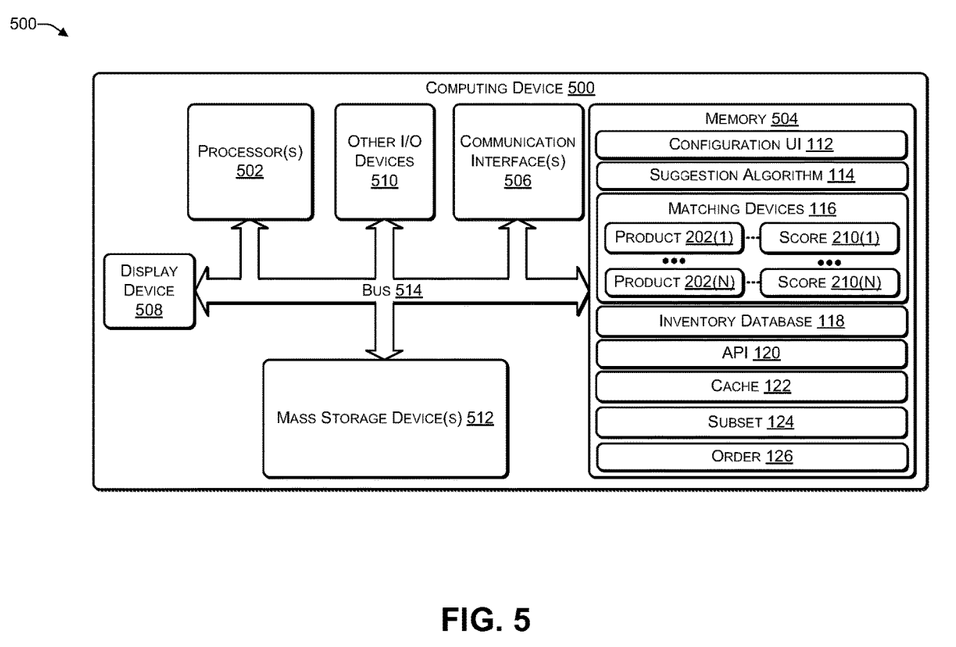
FIG. 5 illustrates an example configuration of a computing device that can be used to implement the systems and techniques described herein.

FIG. 5 illustrates an example configuration of a computing device 500 that can be used to implement the systems and techniques described herein, such as for example, the computing device 102, the server 104, or the server 106 of FIG. 1. The computing device 100 may include one or more processors 502 (e.g., CPU, GP, or the like), a memory 504, communication interfaces 506, a display device 508, other input/output (I/O) devices 510 (e.g., keyboard, trackball, and the like), and one or more mass storage devices 512 (e.g., disk drive, solid state disk drive, or the like), configured to communicate with each other, such as via one or more system buses 514 or other suitable connections. While a single system bus is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 502 are one or more hardware devices that may include a single processing unit or a number of processing units, all of which may include single or multiple computing units or multiple cores. The processors 502 may include a GPU that is integrated into the CPU or the GPU may be a separate processor device from the CPU. The processors 502 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 502 may be configured to fetch and execute computer-readable instructions stored in the memory 504, mass storage devices 512, or other computer-readable media.

Memory 504 and mass storage devices 512 are examples of computer storage media (e.g., memory storage devices) for storing instructions that can be executed by the processors 502 to perform the various functions described herein. For example, memory 504 may include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 512 may be collectively referred to as memory or computer storage media herein, and may be any type of non-transitory media capable of storing computer-readable, processor-executable program instructions as computer program code that can be executed by the processors 502 as a particular machine configured for carrying out the operations and functions described in the implementations herein.

The computing device 500 may include one or more communication interfaces 506 for exchanging data via a network. The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 506 can also provide communication with external storage, such as a storage array, network attached storage, storage area network, cloud storage, or the like.

The display device 508 may be used for displaying content (e.g., information and images) to users. Other I/O devices 510 may be devices that receive various inputs from a user and provide various outputs to the user, and may include a keyboard, a touchpad, a mouse, a printer, audio input/output devices, and so forth.

The computer storage media, such as memory 116 and mass storage devices 512, may be used to store software and data. For example, the computer storage media may be used to store one or more of the configuration UI 112 (e.g., a software program on a server that hosts a site that includes the configuration UI 112), the suggestion algorithm 114, the matching devices 116, the inventor database 118, the API 120, the cache 122, the subset 124, the order 126, other data, other software applications, or any combination thereof. The matching devices 116 may include the products 202 and the associated scores 210.

Thus, a user may navigate to a manufacturer's site that displays a build-to-order UI for a configurable device. When the configurable device is initially displayed, the options may be prefilled with default values. The user may modify one or more of the default values using the build-to-order UI. A suggestion algorithm may monitor which options the user modifies, and display, substantially in real-time, one or more prebuilt devices with matching (e.g., having the same, similar, or better) options from a database of prebuilt devices. In some cases, the suggestion algorithm may determine the order in which the user modifies the default options and determine a priority (e.g., to the user) of the options based on the order. The suggestion algorithm may use the default (e.g., unmodified) options, the modified options, and, in some cases, the priority of the options, to create a score for individual matching prebuilt devices. The matching prebuilt devices may be displayed in descending order of score. For example, a prebuilt device that has a large number of matches may be displayed before a second prebuilt device that has a fewer number of matches. The suggestion algorithm may indicate that the prebuilt devices have faster delivery times, lower prices, or both. For example, the warehouses in which the prebuilt devices are stored may located geographically closer to (e.g., in the same country or in the same state as) the delivery address as compared to the build-to-order factory where custom configured devices are built. In addition, manufacturing multiple computing devices with the same configuration may be cheaper than building a single customized device, thereby resulting in lower prices for prebuilt devices with the same or similar configurations to a custom-built device. In some cases, after the user makes a modification to an option of the configurable device using the configuration UI, the modified option may be compared to the specification of the prebuilt devices. Thus, as the user modifies the configuration of the configurable device, the suggestion algorithm may display, substantially in real-time, a subset of one or more matching prebuilt devices.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    displaying, by one or more processors, a default configuration of a build-to-order (BTO) computing device in a browser that is accessing an application programming interface (API) of a server;
    displaying, by the one or more processors, a build-to-order user interface to modify the default configuration using the API;
    receiving, by the one or more processors, a first modification to the default configuration;
    modifying, by the one or more processors and based on the first modification, the default configuration using the API to create a first modified configuration of the computing device;
    performing, by the one or more processors, a search based on the first modified configuration of an inventory of pre-built computing devices located in one or more warehouses located closer to a delivery address than a factory that builds the BTO computing device;
    receiving, by the one or more processors, a second modification to the default configuration;
    modifying, by the one or more processors and based on the second modification, the default configuration using the API to create a second modified configuration of the computing device;
    performing, by the one or more processors, a search based on the second modified configuration of the inventory of pre-built computing devices located in the one or more warehouses located closer to the delivery address than the factory that builds the BTO computing device;
    scoring results of the search based on the first modified configuration and results of the search based on the second modified configuration to generate a ranked list of prebuilt computing devices that meet the first and/or second modification made to the build-to-order user interface;
    displaying, by the one or more processors, the ranked list of prebuilt computing devices;
    receiving, by the one or more processors, a selection to acquire a particular prebuilt computing device of the ranked list of prebuilt computing devices;
    sending, by the one or more processors, a fulfillment request associated with acquiring the particular prebuilt computing device; and
    caching each search result in a temporary memory location enabling real-time rendering of each search result.

2. The method of claim 1, wherein the modified configuration includes at least one of:
    a modified processor manufacturer;
    a modified processor type;
    a modified processor clock speed;
    a modified drive type;
    a modified drive capacity;
    a modified amount of random access memory (RAM);
    a modified graphics processing unit (GPU) manufacturer;
    a modified amount of video RAM; or
    a modified display device size.

3. The method of claim 1, wherein the particular prebuilt computing device includes at least one prebuilt option that is identical to the first and/or second modified configuration of the computing device.

4. The method of claim 1, further comprising:
    determining an order in which the plurality of modifications to the default configuration are performed; and
    determining a priority associated with individual modifications of the plurality of modifications based at least in part on the order.

5. The method of claim 4, further comprising:
    determining, based at least in part on the priority, a score associated with an individual prebuilt computing device of the one or more prebuilt computing devices; and
    displaying, in descending order of the associated score, the one or more prebuilt computing devices that match the modified configuration.

6. The method of claim 1, further comprising:
    indicating that the particular prebuilt computing device has:
    a lower price compared to the modified configuration of the computing device; and
    an earlier delivery date compared to the modified configuration of the computing device.

7. The method of claim 1, wherein the particular prebuilt computing device comprises one of a laptop computing device, a desktop computing device, a server computing device, a tablet computing device, or a wireless phone.

8. A computing device comprising:
one or more processors; and
one or more non-transitory computer readable media storing instructions executable by the one or more processors to perform operations comprising:
displaying a default configuration of a build-to-order (BTO) device in a browser accessing an application programming interface (API) of a server;
displaying a build-to-order user interface to modify the default configuration;
receiving a first modification to the default configuration;
modifying the default configuration using the API and based on the first modification to create a first modified configuration of the configurable device;
performing a search based on the first modified configuration of an inventory of pre-built computing devices located in one or more warehouses located closer to a delivery address than a factory that builds the BTO computing device;
receiving a second modification to the default configuration;
modifying the default configuration using the API and based on the second modification to create a second modified configuration of the configurable device;
performing a search based on the second modified configuration of the inventory of pre-built computing devices located in the one or more warehouses located closer to the delivery address than the factory that builds the BTO computing device;
displaying a ranked list of prebuilt computing devices, wherein each device on the ranked list match at least one of the first and second modified configurations;
receiving a selection to acquire a particular prebuilt device from the ranked list of prebuilt devices;
sending a fulfillment request to acquire the particular prebuilt device; and
caching each search result in a temporary memory location enabling real-time rendering of each search result.

9. The computing device of claim 8, wherein the modified configuration includes at least one of:
a modified processor manufacturer;
a modified processor type;
a modified processor clock speed;
a modified drive type;
a modified drive capacity;
a modified amount of random access memory (RAM);
a modified graphics processing unit (GPU) manufacturer;
a modified amount of video RAM; or
a modified display device size.

10. The computing device of claim 8, wherein the particular prebuilt device includes at least one prebuilt option that is identical to the first and/or second modified configuration of the configurable device.

11. The computing device of claim 8, wherein the particular prebuilt device includes at least one prebuilt option that exceeds an option of the modified configuration of the configurable device.

12. The computing device of claim 8, further comprising:
determining an order in which the plurality of modifications to the default configuration are performed;
determining a priority associated with individual modifications of the plurality of modifications based at least in part on the order;
determining, based at least in part on the priority, a score associated with an individual prebuilt device of the one or more prebuilt devices; and
displaying, in descending order of the associated score, the one or more prebuilt devices that match the modified configuration.

13. The computing device of claim 8, wherein the particular prebuilt device has a lower price and an earlier delivery date as compared to the modified configuration of the configurable device.

14. One or more non-transitory computer readable media storing instructions executable by one or more processors to perform operations comprising:
displaying a default configuration of a build-to-order (BTO) device in a browser accessing an application programming interface (API) of a server;
displaying a build-to-order user interface to modify the default configuration;
receiving a first modification to the default configuration;
modifying the default configuration using the API and based on the first modification to create a first modified configuration of the configurable device;
performing a search based on the first modified configuration of an inventory of pre-built computing devices located in one or more warehouses located closer to a delivery address than a factory that builds the BTO computing device;
receiving a second modification to the default configuration;
modifying the default configuration using the API and based on the second modification to create a second modified configuration of the configurable device;
performing a search based on the second modified configuration of the inventory of pre-built computing devices located in the one or more warehouses located closer to the delivery address than the factory that builds the BTO computing device;
displaying a ranked list of prebuilt computing devices, wherein each device on the ranked list match at least one of the first and second modified configurations;
receiving a selection to acquire a particular prebuilt device from the ranked list of prebuilt devices;
sending a fulfillment request associated with acquiring the particular prebuilt device; and
caching each search result in a temporary memory location enabling real-time rendering of each search result.

15. The one or more non-transitory computer readable media of claim 14, wherein the modified configuration includes at least one of:
a modified processor manufacturer;
a modified processor type;
a modified processor clock speed;
a modified drive type;
a modified drive capacity;
a modified amount of random access memory (RAM);
a modified graphics processing unit (GPU) manufacturer;
a modified amount of video RAM; or
a modified display device size.

16. The one or more non-transitory computer readable media of claim 14, wherein:
the particular prebuilt device includes a first prebuilt option that is identical to the first and/or second modified configuration of the configurable device; and
a second prebuilt option that exceeds an option of the first and/or second modified configuration of the configurable device.

17. The one or more non-transitory computer readable media of claim 14, the operations further comprising:
determining an order in which the plurality of modifications to the default configuration are performed;

determining a priority associated with individual modifications of the plurality of modifications based at least in part on the order;

determining, based at least in part on the priority, a score associated with an individual prebuilt device of the one or more prebuilt devices; and displaying, in descending order of the associated score, the one or more prebuilt devices that match the modified configuration.

18. The one or more non-transitory computer readable media of claim 17, wherein determining the score associated with the particular prebuilt device comprises:

determining a weight of individual ones of the options of the particular prebuilt device based on the priority;

assigning 1 to a multiplier when an option of the particular prebuilt device is similar or identical to a corresponding option of the modified configuration;

assigning 0 to the multiplier when the option of the particular prebuilt device is lesser than the corresponding option of the modified configuration;

multiplying (i) each weight with (ii) individual ones of the options and (iii) with each multiplier to create weighted options; and summing the weighted options.

19. The one or more non-transitory computer readable media of claim 18, the operations further comprising:

assigning a value greater than 1 to the multiplier when the option of the particular prebuilt device is greater than the corresponding option of the modified configuration.

20. The one or more non-transitory computer readable media of claim 14, wherein the particular prebuilt device is located at a warehouse that is closer to a delivery address specified in the fulfillment request than a factory that builds the configurable device with the modified configuration.

* * * * *